US012028242B2

(12) United States Patent
Goyal

(10) Patent No.: US 12,028,242 B2
(45) Date of Patent: Jul. 2, 2024

(54) INTERLOCKING BORDER GATEWAY PROTOCOL AND MULTI-CHASSIS LINK AGGREGATION GROUP PROCESSES FOR NETWORK DEVICES

(71) Applicant: Arista Networks, Inc., Santa Clara, CA (US)

(72) Inventor: Neha Goyal, San Jose, CA (US)

(73) Assignee: ARISTA NETWORKS, INC., Santa Clara, CA (US)

( * ) Notice: Subject to any disclaimer, the term of this patent is extended or adjusted under 35 U.S.C. 154(b) by 0 days.

(21) Appl. No.: 17/865,230

(22) Filed: Jul. 14, 2022

(65) Prior Publication Data

US 2024/0022502 A1    Jan. 18, 2024

(51) Int. Cl.
*H04L 45/24* (2022.01)
*H04L 45/42* (2022.01)
*H04L 45/74* (2022.01)

(52) U.S. Cl.
CPC ............ *H04L 45/245* (2013.01); *H04L 45/42* (2013.01); *H04L 45/74* (2013.01)

(58) Field of Classification Search
CPC .............................. H04L 45/245; H04L 45/64
See application file for complete search history.

(56) References Cited

U.S. PATENT DOCUMENTS

2016/0218916 A1* 7/2016 Labonte .................. H04L 45/12
2020/0204480 A1* 6/2020 Lo ......................... H04L 45/245
2020/0314003 A1* 10/2020 Nandy .................... H04L 69/14
2021/0109744 A1* 4/2021 Hegde .................... H04L 45/22
2021/0226910 A1* 7/2021 Ranpise ............... H04L 61/103

OTHER PUBLICATIONS

B. A. Begum and S. V. Nandury, "Self-reconfiguration aggregation scheduling to recover from node and interference faults in WSNs," 2017 International Conference on Wireless Communications, Signal Processing and Networking (WiSPNET), Chennai, India, 2017, pp. 1512-1517 (Year: 2017).*
Yin, X., & Gan, W. (2021). Research on high reliability in redundant link aggregation mode doi:http://dx.doi.org/10.1088/1742-6596/1883/1/012015 (Year: 2021).*
R. R. R. Junior, M. A. M. Vieira and A. A. F. Loureiro, "Dynamic Link Aggregation in Software Defined Networking," 2018 IEEE Symposium on Computers and Communications (ISCC), Natal, Brazil, 2018, pp. 00615-00620, (Year: 2018).*

* cited by examiner

*Primary Examiner* — Oscar A Louie
*Assistant Examiner* — Messeret F Gebre
(74) *Attorney, Agent, or Firm* — Fountainhead Law Group, P.C.

(57) ABSTRACT

Embodiments of the present disclosure include techniques for interlocking border gateway protocol and multi-chassis link aggregation group processes for network devices. A first process for configuring a link aggregation group with a second network device is performed. Whether an option to use a media access control (MAC) address shared with the second network device is active is determined. Upon determining that the option to use the MAC address shared with the second network device is active, a second process for configuring the first network device to transmit inter-subnet connectivity information using the shared MAC address is performed.

20 Claims, 6 Drawing Sheets

INTERLOCKING BORDER GATEWAY PROTOCOL AND MULTI-CHASSIS LINK AGGREGATION GROUP PROCESSES FOR NETWORK DEVICES

BACKGROUND

Link aggregation is a technique in computer networking where several network connections are combined in parallel. Combining network connections in this manner provides increased throughput and/or link redundancy for when a link fails. The combined collection of physical ports may be referred to as a link aggregation group (LAG). One type of LAG is a referred to as a multi-chassis link aggregation group (MLAG). With an MLAG, ports on different network devices are combined into a single logical link. In this fashion, an MLAG can provide device level redundancy in the event that a network device fails.

The following detailed description and accompanying drawings provide a better understanding of the nature and advantages of various embodiments of the present disclosure.

DETAILED DESCRIPTION

Figure 1:
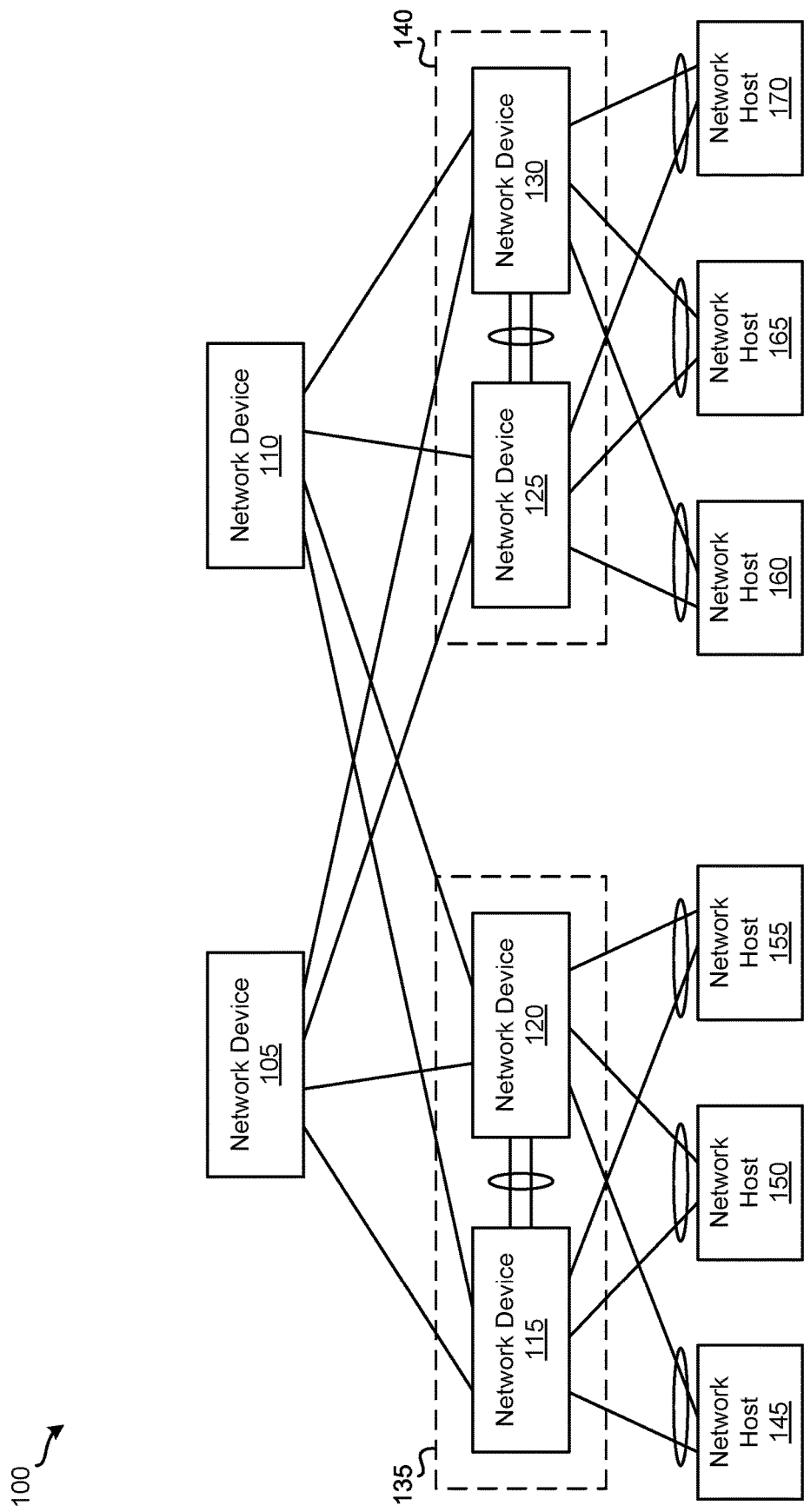
FIG. 1 illustrates a network system according to some embodiments.

In the following description, for purposes of explanation, numerous examples and specific details are set forth in order to provide a thorough understanding of the present disclosure. It will be evident, however, to one skilled in the art that various embodiments of the present disclosure as defined by the claims may include some or all of the features in these examples alone or in combination with other features described below, and may further include modifications and equivalents of the features and concepts described herein.

Described herein are techniques for interlocking border gateway protocol and multi-chassis link aggregation group processes. In some embodiments, a network includes several network devices configured to implement a layer 2 overlay network (e.g., an Ethernet Virtual Private Network (EVPN) network) over the underlay of the network. The network devices are further configured to utilize an exterior gateway protocol (e.g., a border gateway protocol (BGP)) to exchange routing and reachability information with each other. Some of the network devices in the network can also be configured in a multi-chassis link aggregation group (MLAG) where each of the network devices in the MLAG uses the same media access control (MAC) address (also referred to as a shared MAC address) when advertising routing and reachability information for the EVPN overlay network. In addition, each network device in the MLAG is configured with a particular bootup sequence when the network device is starting up. In particular, an MLAG initialization process for setting up the MLAG configuration between the network devices in the MLAG is performed. After an option specifying to use a shared MAC address for the MLAG configuration is enabled/active, an EVPN initialization process is performed for setting up the EVPN configuration, which allows routing and reachability information for the EVPN overlay network to be exchanged with other network devices in the network.

The techniques described in the present application provide a number of benefits and advantages over conventional methods for booting up network devices configured in an MLAG and configured to implement EVPN overlay networks. For example, ensuring that the EVPN initialization process is performed after the option to use a shared MAC address for an MLAG configuration is enabled may prevent traffic loss from occurring at other network devices in the network. Convention methods that fail to control the bootup process in this manner can result in the network devices configured in the MLAG to use their own respective device MAC address for exchanging routing and reachability information for the EVPN overlay network and then switch to using a shared MAC address once the option is enabled. When the network devices in the MLAG transition from using separate device MAC addresses to using a shared MAC address for exchanging routing and reachability information, other network devices in the network reprogram themselves in response to the transition. During the time that these network devices are being reprogrammed, the network devices are unable to route traffic resulting in traffic loss at these network devices.

FIG. 1 illustrates a network system 100 according to some embodiments. As shown, network system 100 includes network devices 105-130 and network hosts 145-170. Each of network hosts 145-170 may be a device configured to send data (e.g., packets) to and receive data from other network hosts (e.g., any of the other network hosts 145-170). In some embodiments, network devices 105 and 110 are configured to be in a first autonomous system (AS), network devices 115 and 120 are configured to be in a second AS, and network devices 125 and 130 are configured to be in a third AS.

Each of network devices 105-130 is configured to route and forward data through network system 100. In this example, network devices 105 and 110 are spine network devices and network devices 115-130 are leaf network devices. In some embodiments, spine network devices connect to and aggregate traffic from leaf network devices. Leaf network devices connect to and aggregate traffic from network hosts and/or other end devices. As illustrated in FIG. 1, network devices 105 and 110 are connected to each of network devices 115-130. Each of network devices 115 and 120 is connected to each of network hosts 145-155. Similarly, each of network devices 125 and 130 is connected to each of network hosts 160-170.

For this example, network devices 105-130 are configured to implement layer 2 overlay networks (e.g., EVPN overlay networks) over the underlay of network system 100 (e.g., the physical connections between network devices 105-130). In addition, network devices 105-130 are configured to use the control plane to exchange routing and reachability information for the overlay networks with each other. In some embodiments, network devices 105-130 use an exterior gateway protocol (e.g., BGP) to exchange such routing and reachability information.

In this example, network devices 115 and 120 are configured in an MLAG. From the perspective of network hosts 145-155, network devices 115 and 120 appear as a single logical network device 135. The MLAG configuration for network devices 115 and 120 is employing a shared MAC address when network devices 115 and 120 advertise routing and reachability information for the layer 2 overlay network. An example of such routing and reachability information includes EVPN type 5 routes. In some embodiments, an EVPN type 5 route specifies an IP prefix that provides encoding for inter-subnet connectivity. Additionally, network devices 125 and 130 are configured in an MLAG for this example. From the perspective of network hosts 160-170, network devices 125 and 130 appear as a single logical network device 140. The MLAG configuration for network devices 125 and 130 is using a shared MAC address when network devices 125 and 130 advertise routing and reachability information for the layer 2 overlay network.

The following will describe an example of how network traffic may be routed through network system 100 in some embodiments. For this example, network hosts 145-155 belong in a first virtual local area network (VLAN). As such, network devices 115 and 120 are each configured with the first VLAN network and a layer 2 routing table (e.g., a MAC virtual routing and forwarding (MAC-VRF) table) associated with the first VLAN. Similarly, network hosts 160-170 belong in a second VLAN. As such, network devices 125 and 130 are each configured with the second VLAN network and a layer 2 routing table (e.g., a MAC-VRF table) associated with the second VLAN.

The example begins by network host 145, which belongs to the first VLAN, sending logical network device 135 a packet destined for network host 170, which belongs to the second VLAN. Specifically, the packet destined for network host 170 includes the MAC address of network host 170. Here, network host 145 transmits the packet to network device 120 via the connection between network host 145 and network device 120. Upon receiving the packet, network device 120 determines that the packet arrived via the first VLAN and performs a routing lookup based on the destination MAC address specified in the packet and the first VLAN (e.g., using the MAC-VRF associated with the first VLAN). The routing lookup determines that the packet is to be routed to an internal VLAN. Thus, network device 120 routes the packet to logical network device 140 (e.g., using a layer 3 routing table, such as an IP-VRF) through the internal VLAN via network device 105 or network device 110.

For this example, network device 125 receives the packet and handles the processing of the packet. When network device 125 receives the packet, network device 125 determines that the packet arrived via the internal VLAN and performs a routing lookup based on the destination MAC address and the internal VLAN. Here, the routing lookup determines that the packet is to be routed to the second VLAN. Based on the destination MAC address of the packet and the second VLAN, network device 125 forwards the packet to network host 170 via the connection between network device 125 and network host 170.

Figure 2A:
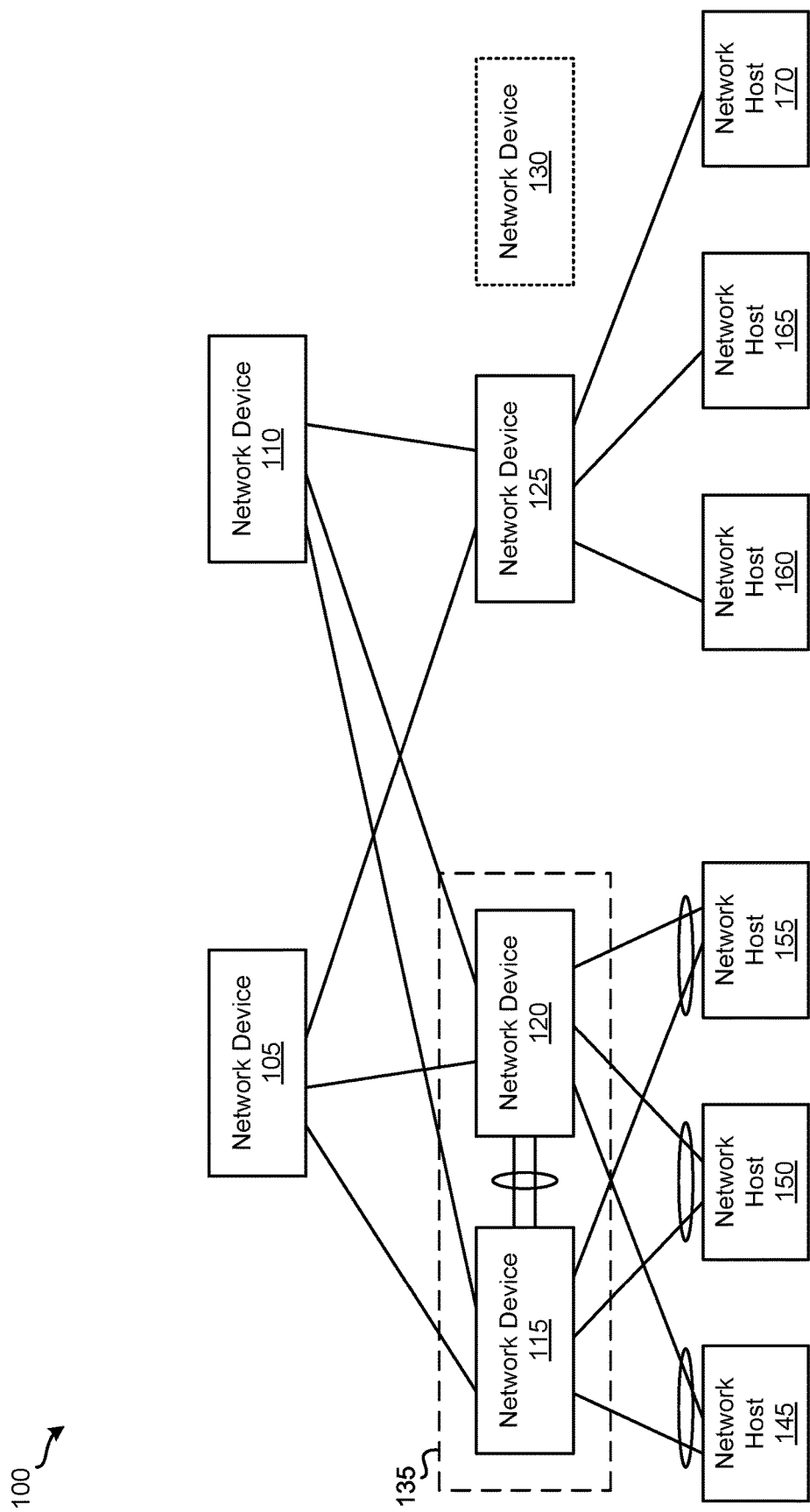
FIGS. 2A-2C illustrate an example bootup process of a network device in the network system illustrated in FIG. 1 according to some embodiments.
Figure 2B:
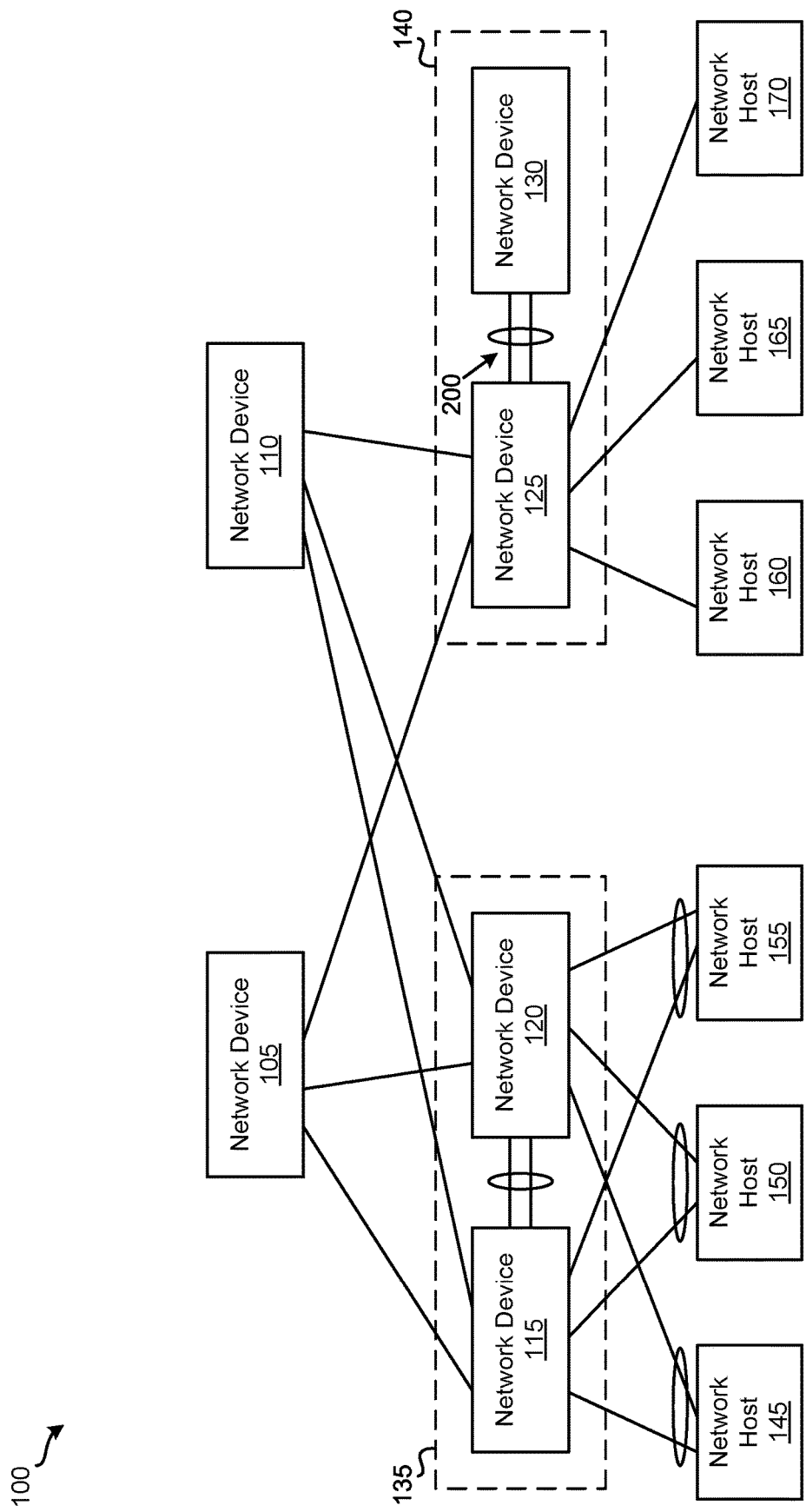
Figure 2C:
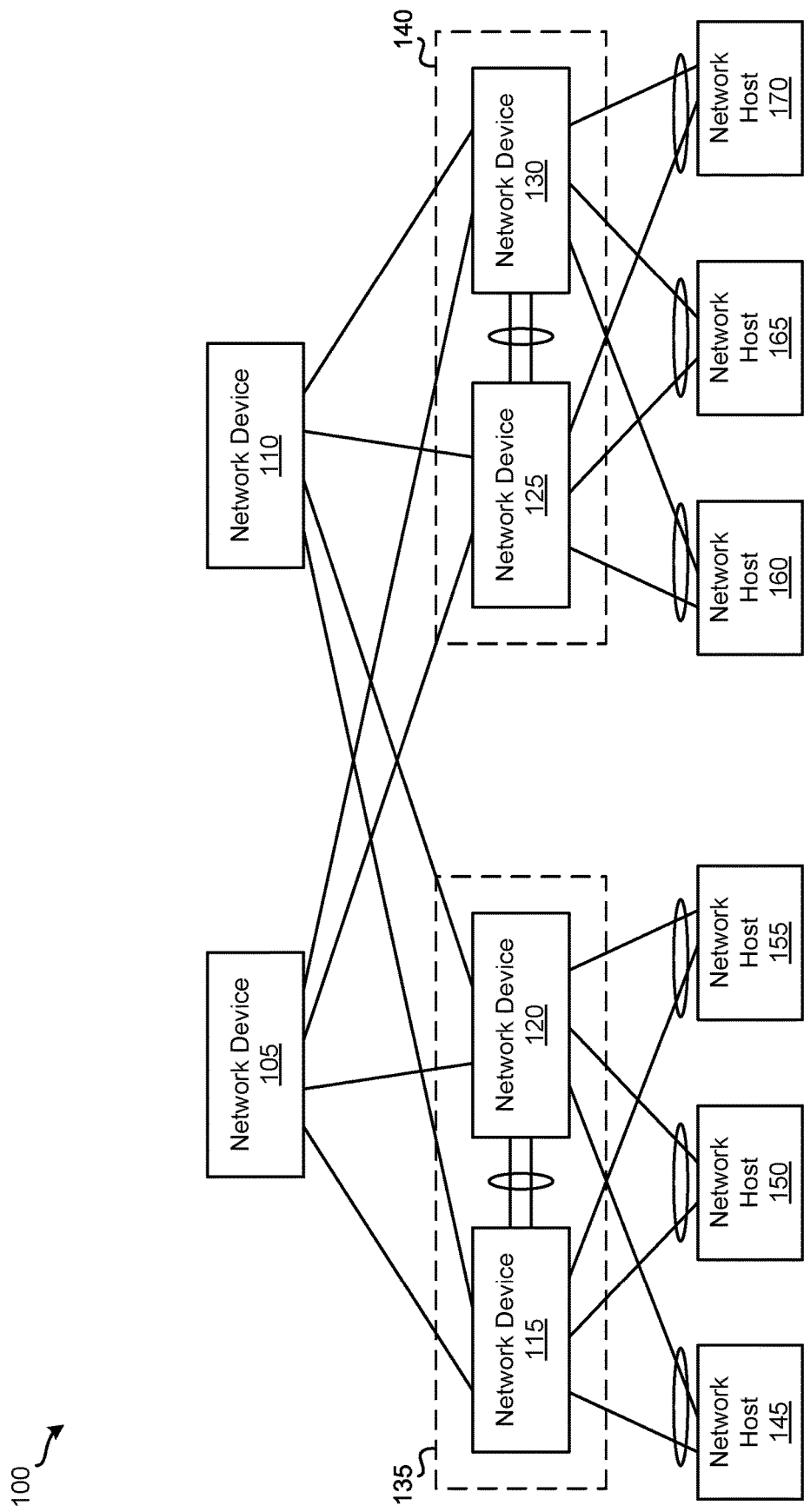

An example operation will now be described by reference to FIGS. 2A-2C. In particular, the example operation will demonstrate the bootup process for a network device configured in an MLAG. FIGS. 2A-2C illustrate an example bootup process of a network device in network system 100 according to some embodiments. As depicted, FIG. 2A illustrates network system 100. Network devices 105-140 and network hosts 145-170 are configured in the same way described above by reference to FIG. 1.

The example operation starts by network device 130 booting (or rebooting). At this time, network device 130 is powered down, as indicated by a dashed border around network device 130 in FIG. 2A. As a result, network device 125 is no longer in an MLAG with network device 130 and logical network device 140 no longer exists. In addition, the connections between network device 130 and network devices 105 and 110 are no longer up. The connections between network device 130 and network hosts 160-170 are also no longer up.

Next, network device 130 powers on and a network operating system executing on network device 130 starts up. During the startup process of network device 130, a first software agent (which may refer to a process, function, application, processing thread, etc.) in the network operating system that is configured to perform an MLAG initialization process begins executing. The first software agent running on network device 130 establishes a set of MLAG links 200 with network device 125. FIG. 2B. illustrates network system 100 after this set of MLAG links are established. As shown, a set of MLAG links 200 are established between network devices 125 and 130. During the MLAG initialization process, network device 130 negotiates with network device 125 to utilize the same MAC address for advertising routing and reachability information for the EVPN overlay network. Once this negotiation is complete, network device 130 enables an option in the MLAG configuration of network device 130 to use a shared MAC address. After the first software agent finishes the MLAG initialization process, logical network device 140 is formed, as depicted in FIG. 2B.

At some point in the startup process of network device 130, links connecting to network device 105, network device 110, and network hosts 160-170 come up. FIG. 2C illustrates network system 100 after those links connected to network device 130 are up. Upon network device 130 detecting that the option to use a shared MAC address for advertising routing and reachability information for the EVPN overlay network is enabled, a second software agent in the network operating system running on network device 130 that is configured to perform a BGP initialization process starts executing. In some cases, the second software agent starts executing the BGP initialization process after the first software agent finishes the MLAG initialization process. In other cases, the second software agent starts executing the BGP process before the first software agent finishes the MLAG initialization process but after the option to use a shared MAC address with network device 125 is enabled. During the BGP initialization process, the second software agent performs a BGP peering process where network device 130 establishes its BGP neighbors (also referred to as BGP peers). In some embodiments, a BGP neighbor of a network device is another network device to which the network device has established a connection for exchanging BGP information. In this example, the BGP neighbors of network device 130 include network device 105 and network device 110.

After BGP neighbors are established, the second software agent starts a process for establishing EVPN peering with the spine network devices in network system 100. Here, this EVPN peering process operating on network device 130 establishes EVPN peering with network devices 105 and 110. In some embodiments, EVPN peering establishes an EVPN overlay network implemented over the underlying physical network connections in order to facilitate communication of EVPN routes between leaf network devices and spine network devices. With EVPN peering established, network device 130 can now exchange routing and reachability information for the EVPN overlay network with other network devices in network system 100 (e.g., network devices 105-120).

Performing the BGP initialization process after the option to use a shared MAC address with network device 125 is enabled prevents traffic loss from occurring at other network devices in network system 100. For instance, if network device 130 performs the BGP initialization process before the option to use a shared MAC address with network device 125 is enabled, it may be possible that the EVPN peering is completed before the option to use a shared MAC address with network device 125 is enabled. In such a scenario, network device 130 would use its own device MAC address as the MAC address to advertise routing and reachability information for the EVPN overlay network. Then, when the option to use a shared MAC address with network device 125 is enabled, network device 130 switches to using the shared MAC address to advertise routing and reachability information for the EVPN overlay network. This can cause network devices 115 and 120 to reprogram themselves in response to the switch. During the time that network devices 115 and 120 are being reprogrammed, network devices 115 and 120 are unable to route traffic resulting in traffic loss at network devices 115 and 120.

Figure 3:
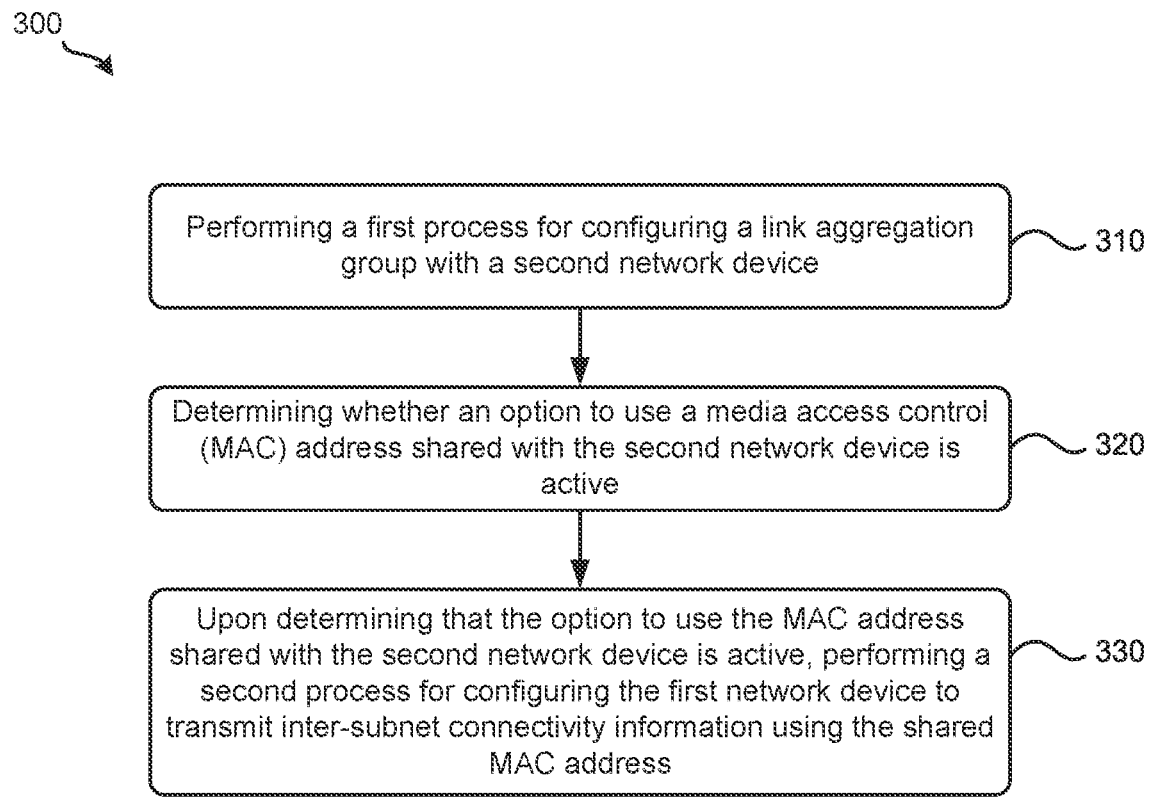
FIG. 3 illustrates a process for interlocking border gateway protocol and multi-chassis link aggregation group processes according to some embodiments.

FIG. 3 illustrates a process 300 for interlocking border gateway protocol and multi-chassis link aggregation group processes according to some embodiments. In some embodiments, a network device configured in an MLAG with other network devices (e.g., network device 115, network device 120, network device 125, and network device 130) may perform process 300. Process 300 begins by performing, at 310, a first process for configuring a link aggregation group with a second network device. Referring to FIG. 2B as an example, a first software agent in a network operating system executing on network device 130 performs an MLAG initialization process in which a set of MLAG links are established with network device 125.

Next, process 300 determines, at 320, whether an option to use a media access control (MAC) address shared with the second network device is active. Upon determining that the option to use the MAC address shared with the second network device is active, process 300 performs, at 330, a second process for configuring the first network device to transmit inter-subnet connectivity information using the shared MAC address. Referring to FIGS. 2B and 2C as an example, during the MLAG initialization process, network device 130 negotiates with network device 125 to utilize the same MAC address for advertising routing and reachability information for the EVPN overlay network. When this negotiation is complete, network device 130 enables/activates an option in the MLAG configuration of network device 130 to use a shared MAC address. Once network device 130 detects that the option to use a shared MAC address for advertising routing and reachability information for the EVPN overlay network is enabled, network device 130 begins executing a second software agent that is configured to perform a BGP initialization process. During the BGP initialization process, the second software agent performs a BGP peering process where network device 130 establishes its BGP neighbors and performs a process for establishing EVPN peering with network devices 105 and 110. After the BGP initialization process is finished, network device 130 may exchange routing and reachability information for the EVPN overlay network with other network devices in network system 100.

Figure 4:
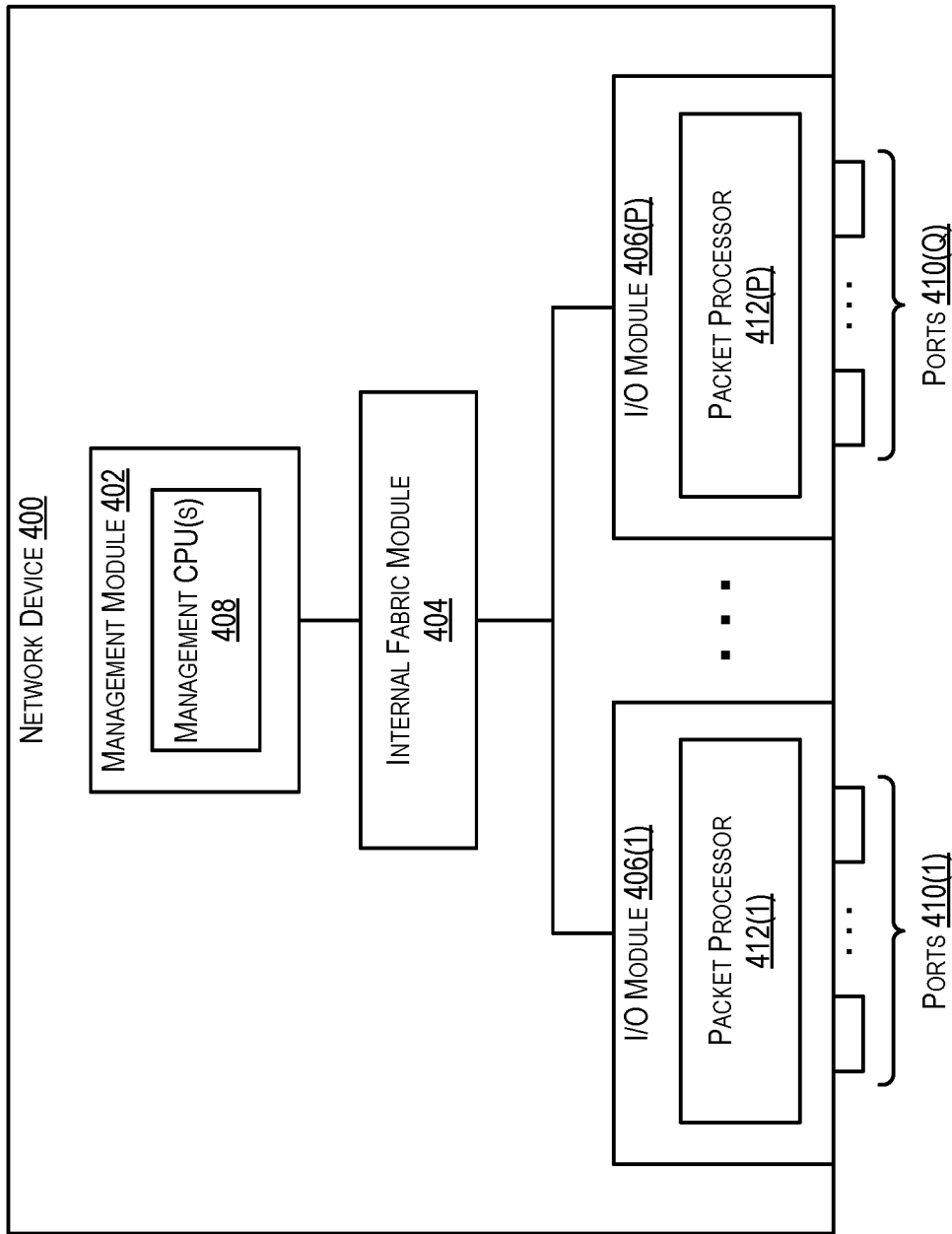
FIG. 4 illustrates an example network device according to some embodiments.

FIG. 4 illustrates the architecture of an example network device (e.g., a network switch or router) 400 that may implement the techniques of the present disclosure according to certain embodiments. For example, network device 400 may correspond to network devices 105-130 shown in FIG. 1.

Network device 400 includes a management module 402, an internal fabric module 404, and a number of I/O modules 406(1)-(P). Management module 402 includes one or more management CPUs 408 for managing/controlling the operation of the device. Each management CPU 408 can be a general-purpose processor, such as an Intel/AMD x86 or ARM-based processor, that operates under the control of program code maintained in an associated volatile memory and/or stored in a non-transitory computer readable storage medium (not shown). In one set of embodiments, this program code can include code for implementing some or all of the techniques described in the foregoing sections.

Internal fabric module 404 and I/O modules 406(1)-(P) collectively represent the data, or forwarding, plane of network device 400. Internal fabric module 404 is configured to interconnect the various other modules of network device 400. Each I/O module 406 includes one or more input/output ports 410(1)-(Q) that are used by network device 400 to send and receive network packets. Each I/O module 406 can also include a packet processor 412, which is a hardware processing component that can make wire speed decisions on how to handle incoming or outgoing network packets.

It should be appreciated that network device 400 is illustrative and other configurations having more or fewer components than network device 400 are possible.

The following are some example embodiments of the present disclosure. In some embodiments, a method is executable by a first network device. The method comprises performing a first process for configuring a link aggregation group with a second network device; determining whether an option to use a media access control (MAC) address shared with the second network device is active; and, upon determining that the option to use the MAC address shared with the second network device is active, performing a second process for configuring the first network device to transmit inter-subnet connectivity information using the shared MAC address.

In some embodiments, the first network device comprises a network operating system configured to execute on the first network device. The network operating system comprises a first software agent configured to perform the first process and a second software agent configured to perform the second process.

In some embodiments, the first software agent is further configured to perform the first process during a startup process of the first network device.

In some embodiments, the second software agent is further configured to perform the second process during a startup process of the first network device.

In some embodiments, the first software agent is further configured to perform a multi-chassis link aggregation group initialization process. The first process is included in the multi-chassis link aggregation group initialization process.

In some embodiments, the second software agent is further configured to perform a border gateway protocol initialization process. The second process is included in the border gateway protocol initialization process.

In some embodiments, determining whether the option to use the MAC address shared with the second network device is active is performed after the first process is completed.

In some embodiments, determining whether the option to use the MAC address shared with the second network device is active is performed during the first process.

In some embodiments, transmitting the inter-subnet connectivity information using the shared MAC address comprises advertising routes using an exterior border gateway protocol.

In some embodiments, a non-transitory machine-readable medium stores a program executable by at least one processing unit of a first network device. The program comprises sets of instructions for configuring a link aggregation group with a second network device; enabling an option to use a media access control (MAC) address shared with the second network device; and, upon determining that the option to use the MAC address shared with the second network device is active, configuring the first network device to transmit inter-subnet connectivity information using the shared MAC address.

In some embodiments, the first network device comprises a network operating system configured to execute on the first network device. The network operating system comprises a first software agent configured to configure the link aggregation group with the second network device and a second software agent configured to configure the first network device to transmit inter-subnet connectivity information using the shared MAC address.

In some embodiments, the first software agent is further configured to configure the link aggregation group with the second network device during a startup process of the first network device.

In some embodiments, the second software agent is further configured to configure the first network device to transmit inter-subnet connectivity information using the shared MAC address during a startup process of the first network device.

In some embodiments, the first software agent is further configured to perform a multi-chassis link aggregation group initialization process, wherein configuring the link aggregation group with the second network device is included in the multi-chassis link aggregation group initialization process In some embodiments, the second software agent is further configured to perform a border gateway protocol initialization process, wherein configuring the first network device to transmit inter-subnet connectivity information using the shared MAC address is included in the border gateway protocol initialization process.

In some embodiments, a first network device comprises a set of processing units; and a non-transitory machine-readable medium storing instructions that when executed by at least one processing unit in the set of processing units cause the at least one processing unit to perform a first process for configuring a link aggregation group with a second network device; during the first process, enable an option to use a media access control (MAC) address shared with the second network device; and perform a second process for configuring the first network device to transmit inter-subnet connectivity information using the shared MAC address.

In some embodiments, the second process is performed after the option to use the MAC address shared with the second network device is enabled.

In some embodiments, the second process is performed after the first process is completed.

The above description illustrates various embodiments of the present disclosure along with examples of how aspects of the present disclosure may be implemented. The above examples and embodiments should not be deemed to be the only embodiments, and are presented to illustrate the flexibility and advantages of the present disclosure as defined by the following claims. Based on the above disclosure and the following claims, other arrangements, embodiments, implementations, and equivalents will be evident to those skilled in the art and may be employed without departing from the spirit and scope of the disclosure as defined by the claims.

What is claimed is:

1. A method executable by a first network device, the method comprising:
    performing a first process for configuring a link aggregation group with a second network device;
    during the first process, negotiating with the second network device to use a media access control (MAC) address shared with the second network device;
    after completion of the negotiation with the second network device, activating an option to use the MAC address shared with the second network device;
    determining whether the option to use the MAC address shared with the second network device is active; and
    after determining that the option to use the MAC address shared with the second network device is active, performing a second process for configuring the first network device to transmit inter-subnet connectivity information using the shared MAC address.

2. The method of claim 1, wherein the first network device comprises a network operating system configured to execute on the first network device, wherein the network operating system comprises a first software agent configured to perform the first process and a second software agent configured to perform the second process.

3. The method of claim 2, wherein the first software agent is further configured to perform the first process during a startup process of the first network device.

4. The method of claim 3, wherein the second software agent is further configured to perform the second process during a startup process of the first network device.

5. The method of claim 2, wherein the first software agent is further configured to perform a multi-chassis link aggregation group initialization process, wherein the first process is included in the multi-chassis link aggregation group initialization process.

6. The method of claim 2, wherein the second software agent is further configured to perform a border gateway protocol initialization process, wherein the second process is included in the border gateway protocol initialization process.

7. The method of claim 1, wherein determining whether the option to use the MAC address shared with the second network device is active is performed after the first process is completed.

8. The method of claim 1, wherein determining whether the option to use the MAC address shared with the second network device is active is performed during the first process.

9. The method of claim 1, wherein transmitting the inter-subnet connectivity information using the shared MAC address comprises advertising routes using an exterior border gateway protocol.

10. A non-transitory machine-readable medium storing a program executable by at least one processing unit of a first network device, the program comprising sets of instructions for:
    configuring a link aggregation group with a second network device;
    negotiating with the second network device to use a media access control (MAC) address shared with the second network device;
    after completion of the negotiation with the second network device, enabling an option to use the MAC address shared with the second network device; and after determining that the option to use the MAC address shared with the second network device is active, configuring the first network device to transmit inter-subnet connectivity information using the shared MAC address.

11. The non-transitory machine-readable medium of claim 10, wherein the first network device comprises a network operating system configured to execute on the first network device, wherein the network operating system comprises a first software agent configured to configure the link aggregation group with the second network device and a second software agent configured to configure the first network device to transmit inter-subnet connectivity information using the shared MAC address.

12. The non-transitory machine-readable medium of claim 11, wherein the first software agent is further configured to configure the link aggregation group with the second network device during a startup process of the first network device.

13. The non-transitory machine-readable medium of claim 12, wherein the second software agent is further configured to configure the first network device to transmit inter-subnet connectivity information using the shared MAC address during a startup process of the first network device.

14. The non-transitory machine-readable medium of claim 11, wherein the first software agent is further configured to perform a multi-chassis link aggregation group initialization process, wherein configuring the link aggregation group with the second network device is included in the multi-chassis link aggregation group initialization process.

15. The non-transitory machine-readable medium of claim 11, wherein the second software agent is further configured to perform a border gateway protocol initialization process, wherein configuring the first network device to transmit inter-subnet connectivity information using the shared MAC address is included in the border gateway protocol initialization process.

16. The non-transitory machine-readable medium of claim 10, wherein transmitting the inter-subnet connectivity information using the shared MAC address comprises advertising routes using an exterior border gateway protocol.

17. A first network device comprising:
 a set of processing units; and
 a non-transitory machine-readable medium storing instructions that when executed by at least one processing unit in the set of processing units cause the at least one processing unit to:
 perform a first process for configuring a link aggregation group with a second network device;
 during the first process, negotiate with the second network device to use a media access control (MAC) address shared with the second network device;
 after completion of the negotiation with the second network device, enable an option to use the MAC address shared with the second network device; and
 after determining that the option to use the MAC address shared with the second network device is active, perform a second process for configuring the first network device to transmit inter-subnet connectivity information using the shared MAC address.

18. The system of claim 17, wherein the second process is performed after the option to use the MAC address shared with the second network device is enabled.

19. The system of claim 17, wherein the second process is performed after the first process is completed.

20. The system of claim 17, wherein the first network device comprises a network operating system configured to execute on the first network device, wherein the network operating system comprises a first software agent configured to perform the first process and a second software agent configured to perform the second process.

* * * * *